Sept. 11, 1951  R. J. WISE ET AL  2,567,307
SYSTEM AND APPARATUS INVOLVING OPTICAL SCANNING
Filed June 12, 1946  5 Sheets-Sheet 2

INVENTORS
R. J. WISE
G. H. RIDINGS
BY
ATTORNEY

Sept. 11, 1951 R. J. WISE ET AL 2,567,307
SYSTEM AND APPARATUS INVOLVING OPTICAL SCANNING
Filed June 12, 1946 5 Sheets-Sheet 3

INVENTORS
R. J. WISE
G. H. RIDINGS
BY
ATTORNEY

Sept. 11, 1951 R. J. WISE ET AL 2,567,307
SYSTEM AND APPARATUS INVOLVING OPTICAL SCANNING
Filed June 12, 1946 5 Sheets-Sheet 5

INVENTORS
R. J. WISE
G. H. RIDINGS
BY
ATTORNEY

Patented Sept. 11, 1951

2,567,307

UNITED STATES PATENT OFFICE 2,567,307

SYSTEM AND APPARATUS INVOLVING OPTICAL SCANNING

Raleigh J. Wise, Dunellen, and Garvice H. Ridings, Summit, N. J., assignors to The Western Union Telegraph Company, New York, N. Y., a corporation of New York Application June 12, 1946, Serial No. 676,180

36 Claims. (Cl. 178—7.1)

This invention relates to facsimile apparatus using optical scanning and possesses novel features applicable to transmitters as well as receivers.

One object of our invention is to provide an improved facsimile machine for scanning a series of separate copy sheets (such as telegrams) in automatic sequence for transmission to a distant recorder. Briefly stated, our automatic transmitter has a conveyor belt on which the telegrams are mounted in spaced relation, and this belt operates continuously to bring the telegrams successively into alignment with a stationary cylinder. The sheet to be scanned is automatically wrapped around the cylinder and held thereon by novel carriage mechanism which slides the supported sheet along the cylinder for internal scanning while the sheet remains attached to the moving belt. The scanning of the telegrams on the belt is done by an optical system which throws a rotary spot of light against the cylindrical inner surface of the supported sheet as it slides off the scanning cylinder onto a guide cylinder from which it is automatically released after the scanning operation. After releasing the scanned sheet, the carriage mechanism returns to wrap the next sheet around the scanning cylinder. The transmitted telegrams are automatically numbered and timed before they are removed from the belt. The machine keeps going until the last message has been sent, whereupon the machine stops itself.

The foregoing and other features of novelty that characterize our invention will be fully set forth in a description of the accompanying drawings in which.

The framework of our facsimile machine is supported on a base plate 10 which may be an aluminum casting with a peripheral flange. A hollow post 12 (Fig. 1) mounted at one end of the base and secured by screws or bolts 13 carries a pulley 14 on a shaft 14', and a second pulley 15 is mounted on a shaft 15' carried by a standard 16 at the other end of the base. The pulleys 14 and 15 are arranged in horizontal alignment lengthwise of the base 10 and support a narrow conveyor belt 17, which may be a thin ribbon of sheet metal, woven wire, metallized fabric or the like. In the particular embodiment we are describing, the two pulleys and the belt should be of metal or otherwise have sufficient conductivity for electrical purposes that will appear later. One of the pulleys, in this case the pulley 14, is driven by an electric motor 18 through suitable gearing 19—20—21 (Fig. 2) housed in the hollow post or box 12.

Figure 14:
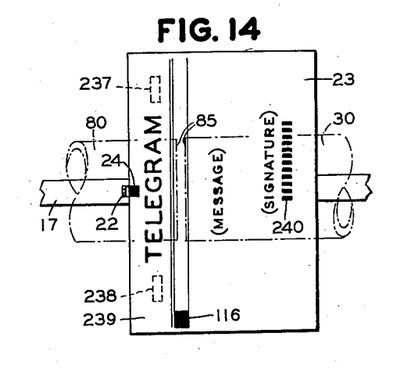
Figs. 14 and 15 are detail views showing a telegraph sheet, first in open position, then wrapped around the scanning cylinder.

The function of belt 17, which moves forward continuously at the proper speed, is to feed the telegram sheets through the machine in an endless procession for scanning one by one. For this purpose, the belt 17 is provided with metal spring clips 22 for holding the telegram sheets 23 in place on the belt. It is only necessary to slip the top edge of the sheet under the clip. To assist the operator in centralizing the sheets we provide the latter with a guide mark 24 at the center of the top edge, as shown in Fig. 14. By slipping this guide mark under the clip the operator knows that the sheet is correctly positioned on the belt. The clips 22 are so spaced along the belt that a narrow space 25 separates adjacent sheets.

Figure 1:
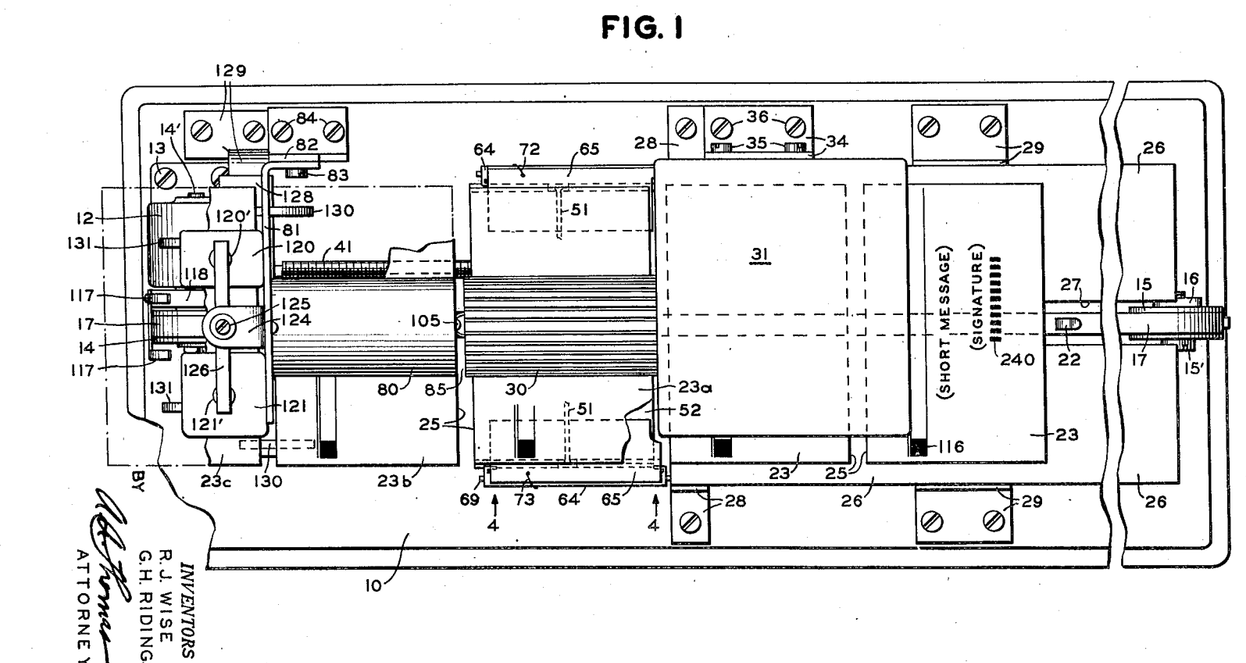
Fig. 1 is a plan view of one form of our facsimile transmitter.
Figures 2, 3:
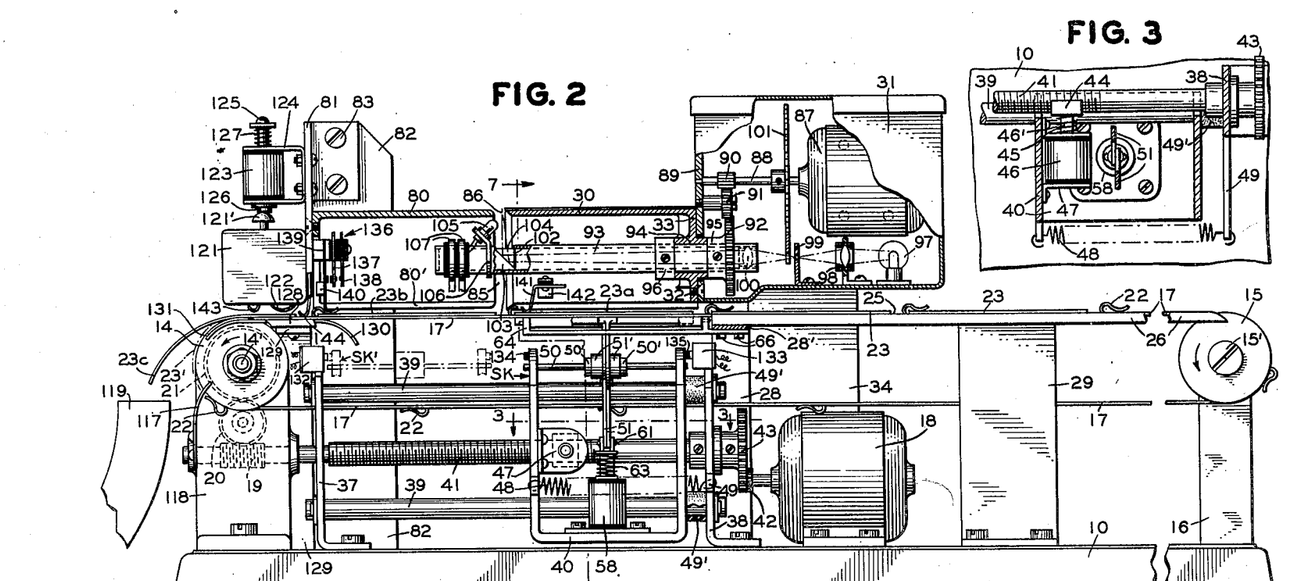
Fig. 2 is a side view of the machine.
Fig. 3 shows in plan a detail on section line 3—3 of Fig. 2.

In the illustrations of Figs. 1 and 2 the belt 17 moves from right to left so that the feed end of the machine is at the right and the discharge end at the left. At the feed end of the machine the narrow belt 17 runs between a pair of rectangular plates 26 which are spaced to provide a slot or channel 27 for the belt. The plates 26 are supported in any practical way, as by a pair of U-shaped standards 28 and 29 mounted on base 10. These plates serve as a stationary table for supporting the telegram sheets as the belt carries them forward to scanning position. The top of the belt is substantially flush with the top of plates 26 (Fig. 7), so that the telegram sheets lie flat and ride smoothly over the plates.

A stationary hollow cylinder or drum 30 is supported lengthwise over the belt 17 to hold the sheets in scanning position. In the present instance, this cylinder is attached to a casing 31 by screws 32 which enter the end wall 33 of the cylinder, as shown in Fig. 2. The cylinder 30 thus projects axially from the casing 31, which houses certain parts of the optical scanning mechanism, as will be explained in due course. The casing 31 is secured to the top of a standard 34 by screws 35 (Fig. 1) and the foot of the standard is fastened to the base 10 by screws 36.

The scanning carriage

Two upstanding angle plates 37 and 38 are mounted on base 10 and support a pair of guide rods 39 in vertical alignment. These guide rods support a scanning carriage indicated as a whole by SK. The various parts of the scanning carriage are mounted on a U-shaped frame 40 which slides along the fixed rods 39 in a definite length of travel between the spaced plates 37 and 38. The carriage is moved forward (from right to left in Fig. 2) by a screw shaft 41 which extends between the plates 37 and 38 and is permanently connected to the motor 18 by gears 42 and 43 mounted on the motor shaft and the screw shaft, respectively. The other end of screw shaft 41 carries the worm or spiral pinion 19 for operating the pulley 14 and the belt 17, as previously mentioned.

Referring to Fig. 3, the frame 40 carries a half-nut 44 which is normally held in contact with the screw shaft 41 by an expanding coil spring 45. The half-nut 44 is disconnected from the screw shaft by a magnet 46 which is mounted on a bracket 47 secured to the frame 40. When the magnet 46 is energized, its plunger 46' pulls the attached half-nut 44 away from the screw shaft. Upon release of the magnet, the spring 45 instantly throws the half-nut into mesh with the screw shaft. The timing of the half-nut magnet 46 will be explained in connection with the control circuits of Fig. 13. A contracting coil spring 48 is attached at one end to a lateral arm or extension 49 of the support 38 and at the other end to the slidable frame 40. Upon release of the half-nut 44 the spring 48 quickly pulls the scanning carriage back to initial position, as shown in Fig. 2. If desired a second return spring may be used at the other side of the carriage frame 40 to assure its smooth operation. Rubber buffers 49' on guide rods 39 form silent stops for the carriage.

Figures 7, 9:
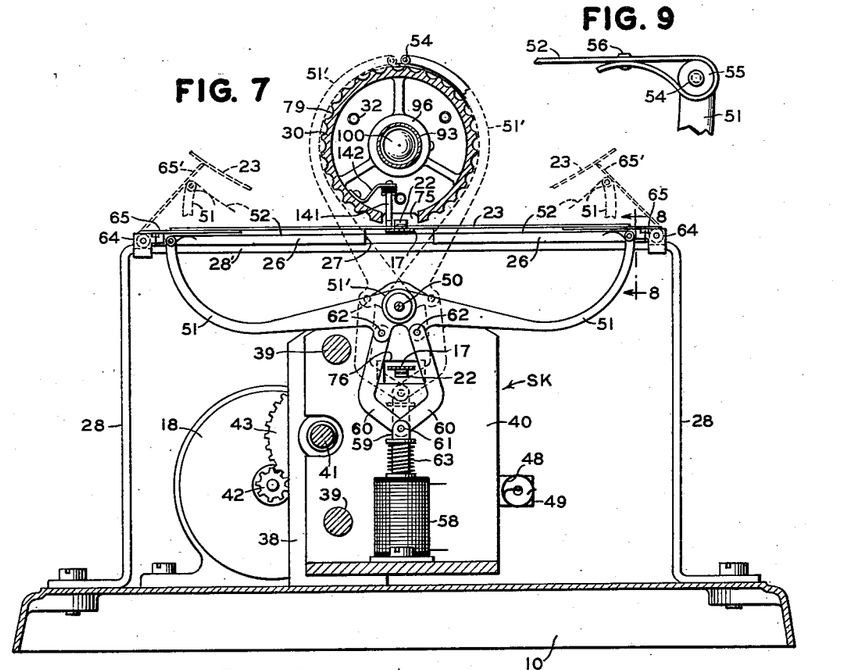
Fig. 7 shows a transverse section on line 7—7 of Fig. 2.
Fig. 9 is an end view of Fig. 8.

The vertical side arms of the U frame 40 carry at the top a rod 50 on which two similar arms or jaws 51 are pivoted between a pair of fixed collars 50' (Fig. 2). Each arm has a hub 51' to provide ample bearing surface, and the two arms are held centralized on rod 50 by the fixed collars 50' on opposite sides of the hubs. As seen in Fig. 7, the pivot rod 50 is centrally below the scanning cylinder 30 and the arms 51 extend in opposite directions curving upwardly at their free ends or tips which carry a flexible band or web 52. This band may consist of any suitable textile material, soft thin leather, a fabric of fine wire, or the like, and is large enough to receive a telegram sheet.

Figures 8, 10, 11, 12:
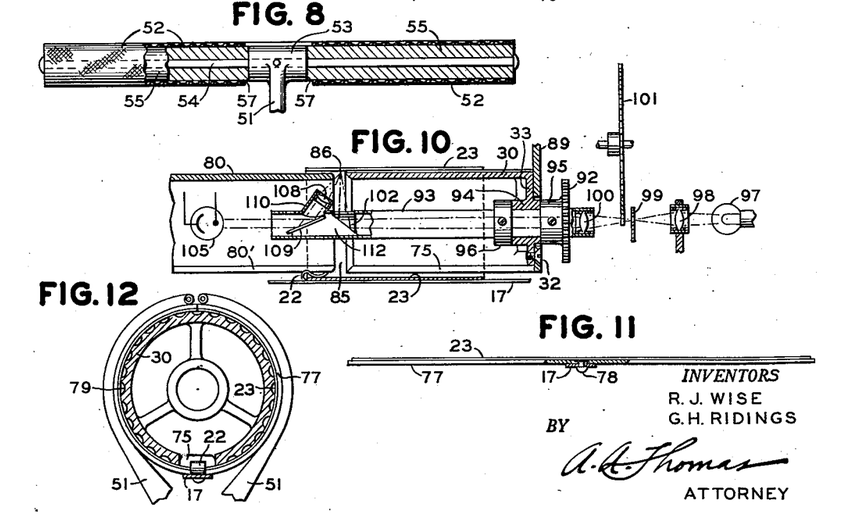
Fig. 8 is an enlarged section on line 8—8 of Fig. 7.
Fig. 10 shows the optical scanning mechanism of our machine partly in diagrammatic form.
Figs. 11 and 12 illustrate the use of message holding pads on the conveyor belt.

A practical way of mounting the band 52 on the arms 51 is shown in the enlarged views of Figs. 8 and 9. Each arm has at its tip a short sleeve or bushing 53 in which a rod 54 is fixed at the center and this rod carries a pair of rollers 55 on opposite sides of the bushing. The ends of band 52 are turned down over the rollers 55 of each arm and fastened in place by suitable means 56 which may be a line of eyelets, rivets, stitching, or the like. The rollers 55 are of the same diameter as the bushing 53 so that the band is smooth and unbroken along the fastened end. A small central portion of each end of band 52 is cut away, as indicated at 57 in Fig. 8, to avoid the arms 51.

The function of the flexible band 52 is to wrap a telegram around the stationary cylinder 30 and move it along for scanning. For this purpose the pivoted arms 51 are connected to an automatic operating device in any practical way. In Fig. 7, by way of example, we show a solenoid 58 mounted on the bottom piece of the U frame 40 and the plunger 59 of the solenoid is connected to a pair of links 60 by a pin 61. These links are connected at their upper ends to the arms 51 by pins 62 which are on oppoiste sides of the supporting rod 50. An expanding coil spring 63 surrounds the plunger 59 and normally tends to swing the arms upward into closed position, as indicated by the dotted lines 51'. This happens only when the solenoid 58 is deenergized. Upon being energized the solenoid pulls down its plunger and the arms 51 are spread apart to open the band 52 which is thereby held taut in flat horizontal position as shown in Fig. 7. It will thus be seen that the arms 51 operate like a pair of jaws which alternately close and open to support and release a message sheet.

Figure 4:
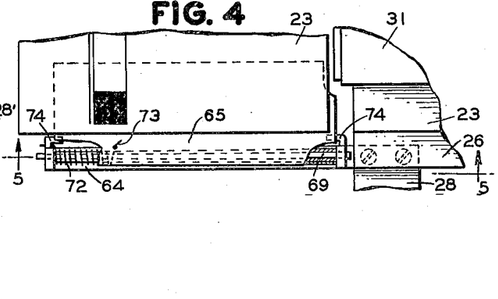
Fig. 4 is an enlarged plan view of a portion of our machine as indicated by the arrows 4—4 in Fig. 1.
Figures 5, 6:
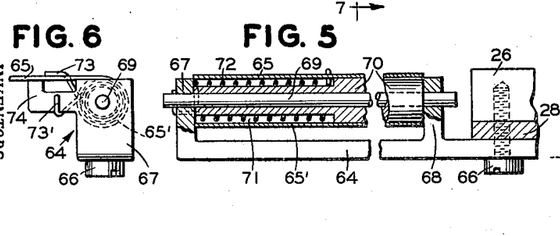
Fig. 5 represents a section on line 5—5 of Fig. 4 in exaggerated dimension for clearance.
Fig. 6 is an end view of Fig. 5.

The U-shaped standard 28 which straddles the base plate 10 carries a pair of horizontal brackets 64 for supporting a pair of hinged plates 65 of sheet metal at opposite sides of the flexible band 52. As the hinged mountings of the two plates are alike, a description of one will apply to both. Referring to Figs. 4, 5 and 6, each bracket 64 is secured at one end to the underside of the cross bar 28' of standard 28 by vertical screws 66 which may also enter the adjacent end of plate 26. The bracket 64 has a pair of upstanding lugs 67 and 68 which carry a fixed rod 69 for supporting a rotatable sleeve 70. The plate 65 curves downward at the edge to provide a tubular hinge portion 65' into which the sleeve 70 is fitted to form a pivot bearing for the plate. It makes no difference whether the sleeve 70 remains stationary or turns with the plate. A section of the sleeve 70 is cut away to provide an annular recess 71 which contains a coil spring 72. One end 73 of the spring bears on the plate 65 and the other end 73' is connected to a lateral extension 74 of bracket 64. The tendency of the coil spring 72 is to keep the plate 65 in horizontal position against the top of extension 74, which acts as a stop. It is preferable to have a stop 74 for each side of the plate, as shown in Fig. 4.

When the arms or jaws 51 are held open by the energized magnet 58, the flexible band 52 is stretched flat and passes under the belt 17 and under the hinged plates 65, as shown in Fig. 7. The open band 52 is, therefore, in a position to receive the telegram sheets 23 as the slowly moving belt keeps feeding them forward. The sheets pass smoothly from the stationary plates 26 onto the hinged plates 65 which may be slightly lower than the plates 26. When the sheet next to be scanned is in alignment with the stationary cylinder 30, as shown at 23a in Fig. 2, the sheet lies fully over the open jaws 51 with the side portions of the sheet lying on the plates 65. This is clear from Fig. 7. When the solenoid 58 is deenergized, the coil spring 63 instantly closes the jaws 51 and the band 52 wraps the enclosed sheet firmly around the cylinder 30 for scanning. The closing movement of the jaws 51 automatically swings the hinged plates 65 upward out of the way, as indicated at 65'. As soon as the plates 65 are disengaged by the closing jaws, they snap back to normal position for receiving the next telegram sheet.

The closed band 52 holds the wrapped telegram sheet in contact with the cylinder 30 all around so that the sheet is supported as a hollow tube for inside scanning. This tubular or cylindrical shape of the sheet 23 on the cylinder 30 is clear from Fig. 12. To allow the passage of belt 17 close under the cylinder 30, the latter is provided with a longitudinal slot 75 at the bottom for clearing the clips 22. The lower run of belt 17 passes through openings 76 in the U plate 40 of scanning carriage SK. The links 60 are so shaped as not to interfere with the movement of the belt whether the links are up or down.

In some cases we may attach felt or rubber pads 77 to the belt 17 for receiving the telegram sheets 23, as shown in Figs. 11 and 12. These pads, which are mounted on the belt at regular intervals in any practical way, as by rivets or eyelets 78, facilitate the conveying of the telegram forms and are wrapped over the message when the jaws 51 are closed around the cylinder 30. The clips 22 are used with the pads for holding the sheets thereon. When the belt 17 is provided with the pads 77, the machine is so designed as to allow passage of the pads through the machine. Let it be understood that we use the term belt in the broadest practical sense, including not only a continuous flexible band but any kind of conveying device that operates like a belt to carry the sheets successively into scanning position. For example, the belt could consist of a series of small plates adapted each to receive a telegram and linked together or otherwise arranged to travel in a continuous path.

*The optical scanning mechanism*

We have already mentioned that the conveyor belt 17 is driven continuously by the motor 18. Consequently, when the telegram sheet 23a is wrapped around the cylinder 30, the sheet keeps on moving since it is fastened to the belt 17. The moment a sheet reaches scanning position as shown in Fig. 2, not only are the jaws 51 closed to wrap the sheet around the cylinder 30 but the scanning carriage SK which is then in starting position is coupled to the screw shaft 51 through the release of the half-nut magnet 46. As a result the scanning carriage (including the closed jaws 51) is moved slowly forward in unison with the belt 17, whereby the sheet wrapped around the stationary cylinder 30 is moved along at scanning speed while the sheet is still clipped to the belt. The cylinder 30 is preferably formed with axial grooves 79 to reduce the contact friction of the sliding sheet.

As the sheet held by the closed band 52 slides off the cylinder 30, it passes over a stationary guide cylinder 80 arranged in axial alignment with the scanning cylinder. The guide cylinder 80 may be supported in any practical way. In the present machine one end of cylinder 80 is mounted on an angle bracket 81 which is secured to the upper end of a standard 82 by screws 83. The standard 82 is fixed on the base plate 10 by screws 84 or otherwise. The guide cylinder 80 is slightly smaller than the cylinder 30 and has a bevelled end so that the sheets slide easily from one cylinder onto the other while being held in cylindrical form by the closed jaws 51. As best shown in Figs. 1 and 10, the two cylinders 30 and 80 are separated at their adjacent ends by a narrow space 85 in which a rotary spot of light indicated at 86 operates to scan the inner surface of the message sheet as it passes from cylinder 30 over to the guide cylinder 80. This rotary scanning point is produced by novel mechanism which we shall now describe.

Referring to Fig. 2, the casing 31 contains an electric motor 87 which has an extended shaft 88 journaled at its outer end in the wall 89 of the casing. The motor shaft 88 carries a pinion 90 geared to an idler 91 which may be mounted on the casing wall 89. The idler 91 is in mesh with a gear 92 fixed on the inner end of a rotary tubular shaft 93 which extends axially through the stationary cylinder 30. The shaft 93 is journaled in a bushing 94 formed in the end wall 33 of cylinder 30 and extending through the wall 89 into the casing. The gear 92 has a hub 95 which cooperates with a collar 96 to hold the rotary shaft 93 against axial displacement. The motor 87 is of the synchronous type and rotates the hollow shaft 93 at a constant high speed.

An exciter lamp 97 mounted in the lightproof casing 31 projects a beam of light through a lens tube 98 and an apertured plate 99 into the open inner end of shaft 93. This end of the shaft encloses a lens assembly 100 (see Fig. 10) for directing the exciter beam lengthwise through the shaft. An interrupter or chopper disk 101 fixed on the motor shaft 88 has its peripheral teeth in the path of the beam between the apertured plate 99 and the lens assembly 100 to interrupt the light at a predetermined frequency. As will be understood without further explanation, this light frequency determines the frequency of the carrier wave on which the scanning signals are transmitted to the recorder.

In Fig. 2 the tubular shaft 93 carries a right angled prism 102 arranged in transverse alignment with the scanning space 85 between the two cylinders 30 and 80. The prism 102 is mounted on a small block 103 fitted inside the shaft 93 which has an opening 104 over the prism. As a result of this construction the light beam entering the hollow shaft 93 from the exciter lamp 97 is reflected radially outward by the prism 102 to form the scanning spot 86 on the inner surface of the cylindrical message sheet. The scanning beam is reflected from the sheet to a photocell 105 which in this instance is arranged so close to the scanning spot 86 that it receives sufficient light from the scanned surface without the need of an interposed lens. The photocell 105 may be mounted on shaft 93 in any practical way as by a band or collar 106. The electrodes of the photocell are connected to a pair of insulated collector rings 107 on shaft 93.

In Fig. 10 the photocell 105 is arranged inside the guide cylinder 80 at such a distance from the scanning spot 86 that an interposed lens 108 and reflector 109 are necessary to direct the signal beam to the photocell. The lens 108 is supported in a tube 110 which is fixed at the proper angle on the shaft 93 as by clamping or soldering. The reflector 109, which may be a small mirror or piece of polished glass, is carried by a block 112 fixed in the hollow shaft 93. For convenience, the prism 102 (which is the same here as in Fig. 2) may also be mounted on block 112.

The scanning operation of the machine will be clear from Figs. 2 and 10. Let us assume that the carriage SK is moving forward from its initial position with a message sheet wrapped around the cylinder 30 by the closed jaws 51. The shaft 93 is rotating rapidly and the spot of light 86 revolves continuously in a circular path normal to the cylinder axis. As the sheet slides off the cylinder 30 across the space 85 (see Fig. 10), the inner cylindrical surface of the sheet encounters the light point 86 which scans the revolving message in a fine spiral track. The linear speed of the traveling carriage SK and the rotary speed of the scanning point 86 are usually so calculated as to produce about 100 scanning lines to the inch. This gives a clear facsimile in the recorder. Each message sheet has a black phasing mark 116 for starting the recorder in phase with the transmitter, as will be understood by those familiar with prior facsimile patents of the present applicants.

*The timing, numbering and discharge of scanned messages*

We have seen how a message is scanned while sliding from cylinder 30 to cylinder 80. When the scanning carriage SK reaches the end of its forward travel, as indicated by the dotted outline SK' in Fig. 2, the scanned message (still clipped to the belt) is fully mounted on the guide cylinder 80. At that moment the jaw magnet 58 and the half-nut magnet 46 are automatically energized to open the jaws 51 and release the carriage SK for return to initial position by the spring 48. The opening of jaws 51 releases the scanned sheet from cylinder 80 so that it is now flat again and free to be carried on by the moving belt 17. Meanwhile, with the carriage SK back in starting position, the jaws 51 are closed again to clamp the next sheet over the scanning cylinder 30.

Referring to Fig. 2, let us follow the final progress of the scanned sheet 23b as it moves from under the guide cylinder 80. As the sheet passes over the pulley 14, the leading edge encounters a stripper 117 which may consist of a pair of curved prongs or fingers arranged on opposite sides of the pulley. It is convenient to mount the stripper on a standard 118 secured to the base 10 and extending between the gear box 12 and the pulley 14. The standard 118 may also form a bearing for the motor driven pulley shaft 14' which projects from the gear box 12.

The spaced prongs 117 may be stamped from sheet metal as a forked unit which extends laterally from the support 118 so that the tips of the prongs overlap the sides of the pulley 14. Consequently, when the forward edge of the scanned sheet (now in flat condition) strikes the prongs 117 which straddle the clip 22, the sheet is stopped and thereby stripped from its clip. In Fig. 2 the dotted lines 23' indicate the position of the sheet just before being stripped, and the stripped sheet is shown at 23c ready to drop into a chute or receptacle 119 for discharge to a convenient point.

It is desirable in a machine of this kind to number the transmitted messages consecutively and to stamp each with the time of transmission. For this purpose we have provided our machine with a numbering stamp 120 and a time stamp 121 which are mounted on the bracket 81. These stamping devices are of standard make and well known construction so that their details need not be shown or described here. It is enough to say that the numbering stamp 120 has a plunger 120' and the time stamp 121 has a plunger 121' projecting at the top. When these plungers are pushed down, the two stamps perform their respective functions.

In Fig. 2 the projecting part 122 may be taken to represent the number wheels of stamp 120 and the time wheels of stamp 121. These wheels are arranged over the message sheet in its final position on the belt 17 so as to print the time and number transversely of the sheet outside the message area. The plungers 120' and 121' are operated simultaneously by a solenoid 123 mounted on the bracket 81 by means of a U-shaped frame 124 which is bolted to the bracket. The movable core 125 of solenoid 123 carries a cross bar 126 which rests on top of the stamp plungers 120' and 121'. When the solenoid 123 is energized, its core 125 is pulled down and operates the stamps 120 and 121. This stamping takes place just before the sheet reaches the stripper 117. When the solenoid is deenergized, a coil spring 127 pulls back the core 125 and allows the stamp plungers to rise. The timed operation of solenoid 123 will be explained in connection with Fig. 13.

Since the stamping wheels 122 bear down on the message sheet with considerable pressure, it is necessary to support the sheet firmly along the line of stamping. We do this by providing a heavy bed plate 128 which extends transversely under the belt 17 and the telegram sheet 23c in line with the printing wheels 122. The bed plate 128 is secured to the top of an upstanding bracket 129 (Fig. 2) which is mounted on the base plate 10. We also make use of the bed plate 128 to support two pairs of fingers 130 and 131 extending in opposite directions. The fingers 130 extend rearward (to the right as viewed in Figs. 1 and 2) to support the sides of sheet 23b after its release by the jaws 51 and to guide the sheet over the bed plate 128. The other two fingers 131 curve forward in line with the periphery of pulley 14 to hold up the sides of the sheet as it slides off the pulley into the chute 119.

*Control switches in Fig. 2*

Figure 13:
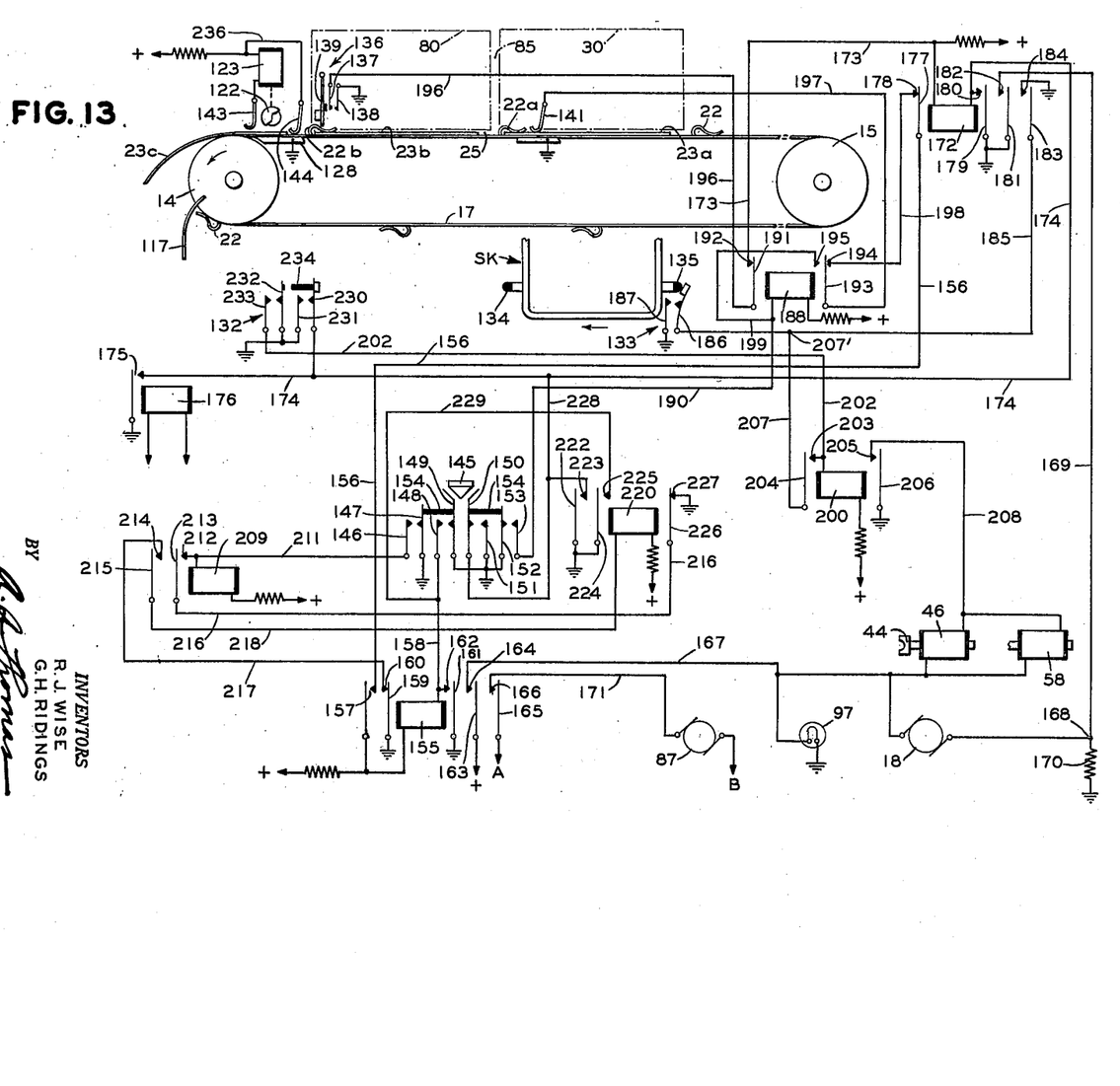
Fig. 13 is a diagram of control circuits for the transmitter.

In describing the construction and operation of the various mechanisms in the machine of Fig. 2, we omitted all reference to certain switches automatically operated by the belt 17 and the scanning carriage SK because an explanation of the function of those switches belongs to the circuit diagram of Fig. 13. However, before taking up Fig. 13, we shall describe the mounting and arrangement of those switches so that their operation will be the more readily understood in Fig. 13 where the switches appear in diagrammatic form only.

A pair of switch boxes 132 and 133 are mounted on top of the angle plates 37 and 38, respectively, so as to be controlled by the scanning carriage SK. For that purpose the carriage is provided with insulated buttons or lugs 134 and 135 in front and back. When the carriage reaches the end of its forward movement, the button 134 operates the switch assembly in box 132. In the initial position of the carriage the rear button 135 operates the switch in box 133. These switch operations enter into the automatic control of the machine, as will presently become clear from Fig. 13.

We utilize the metal clips 22 of the belt 17 to operate a switch 136 mounted on the bracket 81 and arranged inside the guide cylinder 80. This switch comprises a pair of insulated contacts 137 and 138 which are normally open and a spring arm 139 which carries a weight 140 near its free end. The spring arm 139 extends into the path of the moving clips 22 and normally hangs clear of the adjacent contact 137. When a clip encounters the arm 139, it moves the same forward (to the left in Fig. 2) and therefore places it under tension. The moment that the displaced arm 139 is free of the slowly moving clip, it flies back and throws the contact 137 against the contact 138. This closing of the switch lasts but a moment, for the weighted arm instantly resumes its normal position. In other words, as each clip 22 passes under the arm 139, the switch 136 is momentarily closed. The guide cylinder 80, like the cylinder 30, has a longitudinal slot 80' at the bottom to accommodate the clips 22 and the switch operating arm 139.

Referring to Figs. 2 and 7, inside the scanning cylinder 30 is an insulated contact arm 141 of light spring metal mounted on a bracket 142 which is secured to the inner cylinder wall. The arm 141 preferably slants forward in the direction of the moving belt and extends through the bottom slot of cylinder 30. The projecting end of arm 141 engages the telegram sheets on belt 17 and the belt itself when there is no sheet under the arm. The contacting end of the arm 141 may be rounded so as to ride easily and lightly over the engaged surface. It will be remembered that the belt 17 is of conducting material. Therefore, when the contact arm 141 touches the belt, it becomes grounded to the machine, but when the arm rides over a paper message sheet on the belt it remains in an insulated condition. It should be noted (Fig. 7) that the switch arm 141 is arranged to one side of the metal clips 22 and never touches them.

Two contact fingers 143 and 144 (see Fig. 2) project below the numbering and timing mechanism 120—121 and may conveniently be mounted on bracket 81. The contact 143 is in line with the metal clips 22 so as to touch them and thereby become grounded. The other contact 144 is arranged to one side of the clips and engages either a message sheet or the belt 17 whereby this contact is either insulated or grounded. When a clip 22 touches the contact 143, the solenoid 123 operates the stamps 120—121. When there is no sheet under the stamps, the contact 144 prevents their operation, as will presently be explained.

*Control circuits of transmitter (Fig. 13)*

In this circuit diagram any contact or terminal having a plus sign is assumed to be connected to the positive side of a source of direct current and a grounded connection indicates the negative or return side of the power circuit. The letters A and B indicate a source of alternating current for the synchronous motor 87 which operates the hollow shaft 93 and the chopper disk 101. If the same source of direct current potential is used for the relays and magnets as for the motor 18, a suitable resistor is inserted in each relay and magnet circuit to cut down the voltage.

The machine is started by pressing a button 145 which closes a set of four switches having contacts numbered 146 to 153 arranged in pairs. The four contacts 146, 148, 151 and 153 are stationary while the other four contacts 147, 149, 150 and 152 are movable spring arms connected by two insulated pieces 154 for simultaneous operation to closed and open positions. These spring arms are normally in open position and are moved against their respective contacts by the button 145 to close all four switches at the same time. When the button is released, the spring arms automatically return to normal position. It should be understood that the push button 145 represents a suitable form of finger piece for operating any practical form of switch mechanism indicated by the pairs of contacts 146 to 153. For short we shall hereafter identify each of these four switches by one of its contacts only.

A relay 155 has one side connected to a source of positive potential to which a line 156 is also connected through a make contact 157 of the relay. This means that the conductor 156 is connected to the source of power only when the relay 155 is energized. The other side of relay 155 is connected by a wire 158 to the switch contact 148. This relay also operates a break contact 159—160 and three make contacts 161—162, 163—164 and 165—166. Therefore, when the relay 155 pulls up, the back contact 160 will be opened and the other contacts which are normally open will be closed.

The movable contact arms 159 and 161 of relay 155 are grounded, the contact arm 163 is connected to the positive side of a source of direct current, and the contact arm 165 is connected to the bus bar A of an alternating current source. When the starting button 145 is pushed in, the circuit of relay 155 is closed through switch 148 and the relay locks through its contact 162, so that it remains energized when the switch button 145 is released.

The contact 164 of relay 155 is connected to a line 167 which goes to one side of the motor 18 and the exciter lamp 97. The other side of motor 18 is connected at 168 to a line 169, one end of which is grounded through a resistor 170. When, therefore, the make contact 164 is closed by the energized relay, the scanning motor 18 and the exciter lamp 97 are energized. The contact 166 of relay 155 is connected by a wire 171 to one side of the synchronous motor 87, the other side of which goes to a bus bar B of an alternating current source of potential, so that the closing of contact 166 energizes this motor. It will thus be clear that the energizing of relay 155 by the starting button 145 automatically sets the scanning mechanism in operation preliminary to the actual scanning of a sheet.

A relay 172 has its winding connected to wires 173 and 174. The wire 173 connects with the positive side of a direct current source and the wire 174 goes to the grounded contact 175 of a relay 176. The relay 172 has a break contact 177—178 and three make contacts 179—180, 181—182 and 183—184. Contact 177 is connected to wire 156, contacts 179, 181 and 184 are grounded, contact 180 is connected to wire 174, contact 182 is connected to wire 169, and contact 183 is connected to a wire 185 which goes to a spring arm 186 of the switch 133. The other contact 187 of this switch is grounded. The spring arm 186 is held open by the scanning carriage SK in its initial position and automatically closes when the carriage starts forward. The contacts 186—187 will hereafter be identified as switch 133.

A relay 188 is connected at one side to a source of positive potential and the other side of the relay goes to a wire 190 which is connected to contact 153 of the starting switch. The relay 188 has two break contacts 191—192 and 193—194, and a make contact 195 closed by the contact arm 193. The contact arm 191 is connected by a wire 196 to the movable switch contact 137. The contact 192 is connected to wire 173, and the movable arm 193 is connected to the message controlled contact 141 by a wire 197. The contact 194 is connected to contact 178 of relay 172 by a wire 198, and the contact 195 is connected by a wire 199 to the wire 190.

A relay 200 controls the half-nut magnet 46 and the jaw operating magnet 58. One side of this relay is connected to a source of positive potential and the other side is connected to a wire 202. The relay 200 operates two make contacts 203—204 and 205—206. The contact 203 is connected to wire 202 and the movable contact 204 is connected by a wire 207 to the wire 185. The contact 205 is connected to a wire 208 and the movable contact 206 is grounded. The wire 208 connects one side of the magnets 46 and 58 in parallel.

A relay 209 is connected at one side to a source of positive potential and a wire 211 connects the other side of the relay to the switch contact 146. The relay 209 operates two make contacts 212—213 and 214—215. Contact 212 is connected to wire 211 and the movable contact 213 is connected to a wire 216. Contact 214 is connected to the contact 160 of relay 155 by a wire 217 and the movable contact 215 is connected to a wire 218.

A relay 220 is connected at one side to a source of positive potential and the other side of the relay goes to wire 218. The relay 220 operates two make contacts 222—223 and 224—225 and a break contact 226—227. The movable contacts 222 and 224 are grounded. Contact 223 is connected to a wire 228 which goes from the switch contact 150 to conductor 174. Contact 225 is connected by a wire 229 to the wire 158 which leads from the negative side of relay 155. The movable contact 226 is connected to wire 216 and the companion contact 227 is grounded.

The switch assembly 132 which is operated by the scanning carriage SK at the end of its forward movement comprises two pairs of normally open contacts 230—231 and 232—233. The contact 230 is connected to wire 174, the contacts 231 and 232 are grounded, and the contact 233 is connected to wire 202. The contacts 230 and 232 are spring arms adapted to be moved to closed position when the pin 134 on the advancing carriage strikes the front arm 230. This arm carries an insulated pin or button 234 which is normally spaced from the rear arm 232 so that the switch 230—231 closes slightly ahead of the switch 232—233. The reason for this timing of the two carriage operated switches will appear in due course. It will be convenient to refer to these switches by the single numerals 230 and 232, respectively.

The winding of solenoid 123, which operates the numbering stamp 120 and the time stamp 121, is connected at one side to a source of positive potential and at the other side to the spring contact 143, which is arranged in the path of the metal clips 22 on belt 17. Consequently, whenever a clip touches the contact finger 143, the solenoid 123 is energized. A shunt wire 236 connects the positive side of solenoid 123 to the spring contact 144 which is arranged out of the path of the clips 22 and is held by the message sheets out of contact with the grounded frame of the machine. Therefore, when there is no sheet under the contact 144, the solenoid 123 is short-circuited and cannot operate even when the contact 143 engages a clip 22. This prevents operation of the stamping device 120—121 when there is no message sheet in stamping position.

Operation of the machine

We are now prepared to follow the various steps that occur in the transmitter for the automatic scanning of the messages on belt 17. This belt may be as long as needed to hold at one time the required number of messages. Let us suppose that when the machine is started by the operation of push button 145 there is no message sheet in scanning position. In fact we shall assume that the first message placed on the belt by the attendant is several clips away from the scanning cylinder 30. This means that a certain length of empty belt has to be moved forward before the first message is in scanning position and it is desirable to cover this distance in faster than scanning time. We accomplish this result automatically in the following way.

When the button 145 is pushed in to start the machine, the relay 155 is instantly energized through the closed switch 148 and locks through its make contact 162, so that the button can be released right away. At the same time the relay 172 is energized through wire 174 and the closed switch 151, the relay locking through its grounded make contact 180. With both of the relays 155 and 172 energized, the circuit of the direct current motor 18 which operates the belt 17 is closed through make contact 164 of relay 155, wire 167, through the motor windings to point 168, then through wire 169 and the closed contact 182 of relay 172. This cuts the resistor 170 out of the motor circuit and causes the motor 18 to operate at high speed, so that the belt 17 moves rapidly forward to bring the first message sheet into scanning position. The closing of relay contact 166 connects the high speed synchronous motor 87 to the alternating current source A—B. The closing of relay contact 164 also lights the exciter lamp 97.

The closing of switch 153 energizes the relay 188 which opens its break contact 192 to prevent short-circuiting of the relay 172 when a passing clip 22 causes the momentary closing of switch 136 by the weighted arm 139, as previously explained. The relay 188 locks through its make contact 195 and the grounded contact 141, which remains grounded as long as there is no message sheet in scanning position under the stationary cylinder 30. Therefore, as long as the relay 188 is energized, relay 172 remains energized and the motor 18 runs at high speed to shorten the intervals during which no scanning takes place.

The closing of switch 146 by the push button 145 energizes the relay 209 which locks through its make contact 212, wire 216, and the closed grounded contact 227 of the still unenergized relay 220. The closing of make contact 214 of relay 209 does not close the circuit of relay 220 because the energized relay 155 holds the break contact 160 open. At this time the energizing of relay 209 performs no other service than to close its make contact 214 for future use.

Since the relay 200 is not yet energized, its make contact 205 is open so that the half-nut magnet 46 and the jaw operating magnet 58 remain inert. Therefore, the scanning carriage SK is connected to the screw shaft 41 and the empty arms or jaws 51 are wrapped around the stationary cylinder 30. The closing of switch 133 as the carriage leaves its initial position has no effect at this moment. We now have the belt 17 and the empty scanning carriage SK moving forward in unison at fast speed. The scanning mechanism is energized to the extent that the exciter lamp 97 is on and the synchronous motor 87 drives the chopper disk 101 together with the hollow shaft 93 which rotates the spot of scanning light 86. In other words, the machine is now fully conditioned for the first scanning operation.

Bear in mind that we are now describing the first forward movement of the empty scanning carriage SK after starting of the machine. When the carriage completes its forward travel, it closes the switch 232 and thereby energizes the relay 200. The companion switch 230 is also closed but it performs no useful function at this time. The energized relay 200 locks through its contact 233 and through the closed contact 184 of energized relay 172. There is also a shunt path that goes from point 207' to the closed switch 133 but at the moment this path is merely an additional means for locking the relay 200. The energizing of this relay closes the circuit of magnets 46 and 58 through the closed contact 205 so that the scanning carriage SK is disconnected from the screw shaft 41 and the jaws 51 are opened. The released carriage is quickly restored to initial position by the spring 48.

The opening of the two switches 232 and 133 by the return of carriage SK to initial position does not release the relay 200 because it remains locked as above described. Therefore, after moving forward once, the empty scanning carriage not only disconnects itself from the screw shaft 41 but remains idle with the arms 51 open as long as the moving belt 17 is empty of messages as it passes under the cylinder 30. In other words, the carriage is waiting with open arms for the first message to be brought into scanning position.

When the first message sheet on belt 17 comes under the cylinder 30, as represented by the sheet 23a in Fig. 13, the ground connection of contact 141 is broken by the sheet of insulating paper on which the contact now rests. The relay 188 is thereby deenergized and closes its contact 192. At the instant when the advancing sheet 23a reaches scanning position and insulates the contact 141, the preceding clip 22b momentarily closes the switch 136 as previously explained, whereby the relay 172 is short-circuited and deenergized. These short-circuiting connections can be traced through wire 173, closed contact 192, wire 196 and the closed switch 136. It may be noted here that the closing of relay contacts 178 and 194 by the deenergizing of relays 172 and 188 does not affect the energized relay 155. The short-circuiting of this relay through wires 156 and 197 is prevented by the now insulated contact 141.

The release of relay 172 opens the contact 182 so that the circuit of motor 18 is now closed through the resistor 170. The motor slows down the drive of belt 17 and the screw shaft 41 to predetermined scanning speed. The opening of relay contact 184 deenergizes the relay 200 which opens its contact 205 to release the half-nut magnet 46 and the jaw closing magnet 58. So it is clear that the moment when a sheet 23a reaches its scanning position, the carriage SK is automatically connected to the rotating screw shaft 41 and the arms 51 are closed to mount the sheet 23a on cylinder 30. The scanning of the sheet now proceeds as heretofore described. Of course, if there is a sheet under the scanning cylinder 30 when the starting button 145 is pushed, the scanning of the sheet begins immediately with the motor 18 operating at low speed.

Let us now suppose that the sheet has been scanned and moved to the position 23b on the guide cylinder 80. The carriage SK has reached the end of its forward travel and has successively closed the two switches 230 and 232. The closing of switch 230 energizes the relay 172 through wire 174, whereupon the relay locks through its make contact 180. The location of contact 141 is such that it touches the metal belt 17 in the space 25 between adjacent sheets after the closing of switch 230. Therefore, this momentary grounding of contact 141 will not short-circuit the relay 155 because contact 178 of the energized relay 172 is now open. Another way to prevent short-circuiting of relay 155 when the contact 141 passes from one sheet to the next would be to make this contact wide enough to span the gap between the sheets and thereby keep the contact insulated. However, we prefer the arrangement described because it is independent of the width of the gap between the sheets. When the relay 172 is energized, the circuit of motor 18 is closed through wire 169 and contact 182, whereby the resistor 170 is short-circuited and the motor operates at high speed to bring the next sheet quickly into scanning position.

After the contact 141 has passed over the grounding space 25, the clip 22b momentarily closes the switch 136 and thereby short-circuits the relay 172 through wire 173, closed contact 192 of the dead relay 188, and the wire 196. The scanning carriage SK is now at the end of its forward travel and has closed the switch 232. The closing of this switch energizes the relay 200 through wire 202, the relay locking through its make contact 203 and the closed contact 184 of the energized relay 172. At this moment the locking circuit of relay 200 may also go through the closed switch 133. When the make contact 205 of relay 200 closes, the magnets 46 and 58 are energized, resulting in the release of carriage SK and the opening of arms 51. The empty carriage is now pulled back suddenly to initial position under the scanning cylinder 30.

When the carriage SK starts moving back, the end switches 230 and 232 spring open, performing no function at this time, but the switch 133 remains closed until the carriage reaches its initial position. The relay 200 remains energized as long as the switch 133 is closed. When the carriage SK is back in its initial position, the switch 133 is opened and the relay 200 is released to deenergize the magnets 46 and 58. Consequently the moment that the carriage SK is ready for the next sheet, the arms 51 are closed to wrap the sheet around the cylinder 30 and the half-nut 44 connects the carriage to the rotating screw shaft 41. The motor 18, it will be recalled, is now running at low speed and the new sheet undergoes the scanning operation previously described.

We shall now follow the progress of the scanned sheet 23b after it has been released from the jaws 51 and is lying open on the moving belt 17. When the grounded clip 22b encounters the contact 143, the solenoid 123 is energized and operates the numbering stamp 120 and the time stamp 121, as heretofore described. In the design of the machine as illustrated it was convenient to locate the stamping mechanism 120—121 in such position that the stamping takes place on the head portion of the message sheet. For example, in Fig. 14 the rectangles 237 and 238 on the heading 239 of the telegram form represent respectively the numbering and timing indicia printed by the stamps 120 and 121. However, the stamping can be applied to the sheet at the bottom or in any other available space thereon.

It is not essential that the stamping of the sheets shall be done after the scanning, for this operation can as well take place before scanning by mounting the stamps to the right of cylinder 30 (as viewed in Fig. 2). Then, again, the two stamp devices 120 and 121 can be so arranged that one stamp will operate before scanning and the other stamp after scanning. Further, while in this case we make use of the clips 22 to effect the automatic operation of the stamps, we want it understood that in the broader aspect of our invention the stamps may be controlled in any other practical way. For example, a photocell could be used for that purpose.

After a sheet has been stamped, it is released from its clip by the stripper 117 and drops into the chute or receptacle 119. In Fig. 13 the final position of the stamped and released sheet is shown at 23c where it is ready to drop off the moving belt. In this way message after message is automatically scanned, stamped and removed from the machine. All that the attendant has to do is to attach new sheets to the belt as it keeps on moving forward. It should be noted that if no sheet is present under the stamping mechanism 120 and 121, the contact 144 is grounded and the solenoid 123 is short-circuited to prevent the operation of the stamps.

In the foregoing description of the operation of our transmitter we assumed that the sheets carried each a long message that required scanning of the sheet to the end. This, of course, makes it necessary to move a sheet from position 23a to position 23b at low scanning speed. Now, in the case of a short message it would be a waste of time to scan the entire sheet. To avoid this objection we apply an end-of-message stamp to the sheet right after the message, as shown at 240 in Fig. 1.

The end-of-message stamp 240 consists of a line of black dots which produce a special signal when scanned and thereby cause the tuned relay 176 to be energized. This relay responds only to the end-of-message signal and closes its contact 175 to energize the relay 172 whereby the motor 18 speeds up and drives the scanning carriage faster the rest of the way. In other words, the end-of-message switch 175 does the same thing that the carriage control switch 230 accomplishes, the two switches being connected to conductor 174 in shunt to each other. The closing of either one of those switches energizes the relay 172 to speed up the motor 18.

Figure 15:
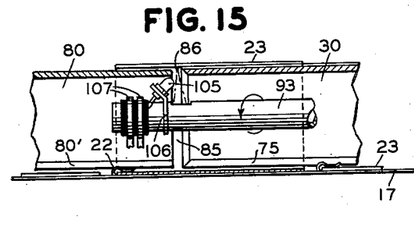

In Figs. 1 and 2 the relation of the message sheets to the scanning cylinder 30 is such that the entire sheet is wrapped around the cylinder for scanning. That is the proper arrangement when the recording sheets at the receiver are mere blanks without a heading. For then the usual printed heading on the transmitted sheet should be facsimiled to the recorder. However, where the recorded blanks are provided with a printed heading and are duplicates of the message blanks in the transmitter, there is no need to scan the heading of the telegram forms. In that case, as shown in Figs. 14 and 15, the telegrams are so arranged on belt 17 that when a sheet is wrapped around the cylinder 30 the heading 239 overlaps the guide cylinder 80 and the scanning begins at the phasing mark 116. This overlapping arrangement saves considerable time in the transmission of a message.

*When the last message has been transmitted*

It is evident from what has been said that the transmitter once started continues to operate automatically as long as there are messages on the belt 17. Suppose now that the last message has been transmitted and is in the position 23b under the guide cylinder 80. The scanning carriage SK has been returned to starting position, but now there is no sheet under cylinder 30 and the contact 141 is grounded.

When the passing clip 22b of the last sheet 23b closes the switch 136 for a moment, the relay 172 is deenergized by being short-circuited through wire 173, closed contact 192 of the dead relay 188, wire 196 and switch 136. The released contact 178 of relay 172 short-circuits the relay 155 through wire 156, contact 178, wire 198, contact 194 of relay 188, wire 197 and the grounded contact 141. With relay 155 deenergized, the released contact 164 opens the circuit of motor 18, but it is necessary to continue the operation of the belt 17 until the last sheet 23b has been stamped and stripped from the belt. We accomplish this by the following means.

Remember that the relay 209 was energized at the start and has remained so all this time doing no more than holding its make contact 214 closed. On the other hand, the relay 220 has remained inoperative because the contact 160 of the energized relay 155 has been open since the starting of the machine. Upon release of the relay 155 as just described, its contact 160 is closed and the relay 220 is energized, closing its contacts 223 and 225, at the same time opening its contact 227. The closing of contact 225 reenergizes the relay 155 through the shunt wire 229, and the closing of contact 223 reenergizes the relay 172 through wires 174 and 228. The opening of contact 227 breaks the circuit of relay 209, which opens its contact 214 to deenergize the relay 220.

The reenergization of relays 155 and 172 by the momentary energizing of relay 220 causes the motor 18 to operate at increased speed so that the belt 17 is now running fast to move the last sheet from position 23b into position for stamping and stripping. It is to be assumed that when the sheet is in its final or falling off position, the empty clip 22a has moved to position 22b and has just closed the grounded switch 136. This short-circuits the relay 172 and in turn the relay 155 is short-circuited through the grounded contact 141. Consequently, upon removal of the last sheet from belt 17 the machine automaticaly stops with all circuits opened. If the relay contact 157 in line 156 is omitted, this line will continue to draw battery current after the machine stops, but nothing happens from that because all the relays are deenergized. To start the machine again, it is only necessary to press the button 145 and the operating sequences previously described are automatically repeated.

*Summary of operation*

The operation of our automatic facsimile transmitter will be clearly understood from the preceding detailed description. For convenience we present a summary of what happens in the machine from the time the start button is pressed until the last scanned sheet has been removed.

Assume that the first sheet to be scanned is at a distance from cylinder 30. The carriage SK is in starting position, holding the switch 133 open. You press the button 145 for a moment and let go. Instantly the following operations take place automatically:

1. The main or scanning relay 155 is energized through switch 148 and locks through its contact 162.
2. The fast relay 172 is energized through switch 151 and locks through its contact 180.
3. The relay 188 is energized through switch 153 and locks through its contact 195 and the grounded contact 141.
4. The auxiliary relay 209 is energized through switch 146 for future use.
5. The motor 18 and exciter lamp 97 are energized through contact 164 of relay 155. The motor circuit is closed through contact 181 of relay 172, the resistor 170 being cut out, so that the motor operates at high speed.
6. The relay 200 is not energized when the machine is started, so that the half-nut magnet 46 and the jaw magnet 58 remain idle. The carriage SK is, therefore, connected to the screw shaft 41 and the empty jaws 51 are closed over the scanning cylinder 30.

We now have the energized motor 18 driving the belt 17 and the carriage SK at fast speed, since no scanning is yet being done.

When the carriage reaches the end of its first forward movement, the two switches 230 and 232 are closed. The relay 200 is now energized and closes the circuit of magnets 46 and 58, whereby the scanning carriage SK is released for return to initial position with its arms open. The relay 200 remains energized through contact 184 of relay 172, even after the switch 133 is opened by the returned carriage.

Therefore, after making one round-trip the scanning carriage SK remains stationary under the cylinder 30 with the arms open as long as there are empty clips on the moving belt.

When the first message sheet is brought scanning position by the fast moving belt, the ground of contact 141 is broken with the following results:

1. Relay 188 is released by the message sheet breaking the ground of contact 141. (Incidentally, this relay remains deenergized until the starting switch is again operated.)
2. Relay 172 is released by short-circuiting through the momentary closing of switch 136 by the passing clip.
3. Relay 200 is released by the opening of contact 184 of relay 172, thereby releasing the magnets 46 and 58, so that the carriage SK is connected to the screw shaft 41 and the arms 51 are closed to wrap the message sheet around the cylinder 30.
4. Relay 155 remains energized and the motor circuit is now closed through the resistor 170, so that the belt 17 and carriage SK move along at low speed for scanning.

At the conclusion of the scanning operation, the carriage SK closes the switches 230 and 232. The previously released relays 172 and 200 are again energized, whereby the next sheet is moved quickly into scanning position and is then wrapped around the cylinder 30. The machine now goes through another scanning cycle, which is automatically repeated for each sheet.

If a particular message is short and is followed by the end-of-message stamp 240, the tuned relay 176 is operated to energize the fast relay 172 before the carriage SK has reached its final position. The motor 18 is thus speeded up to drive the belt 17 fast until the next sheet is in scanning position. After the last message has been scanned and is under the guide cylinder 80, with no message under cylinder 30, the contact 141 is grounded and the following operations take place:

1. Relay 172 is short-circuited when the switch 136 is closed by the clip that holds the last sheet.
2. Relay 155 is thereupon short-circuited by the grounded contact 141.
3. Relay 220 is now energized for the first time through the closing of relay contact 160.
4. Relays 155 and 172 are now again energized through the closed contacts of relay 220.

Consequently, the motor 18 runs fast to move the last scanned sheet into final position for stamping and stripping. The next clip closes the switch 136, whereby the relays 172 and 155 are short-circuited in succession. All relays are now deenergized and the machine stops.

Since one of the main objects of our present invention was to produce an automatic facsimile transmitter with optical scanning, we have illustrated and described it as such, but it will be apparent that various features of our invention are applicable to facsimile and other types of recorders using optical scanning.

While we have shown and described certain specific constructions embodying the various features of our invention, it is to be understood that the drawings and description are merely illustrative of our invention and not a restriction or limitation thereof. Nor is it necessary that all the novel features of our invention shall be employed in the same machine or system, for it is evident that some features may be used without others. It is to be expected that in the commercial practice of our invention changes and modifications will be resorted to within the scope of the appended claims.

We claim as our invention:

1. In a facsimile machine, a cylinder for holding a unitary sheet to be scanned, a flexible band supported adjacent to said cylinder and spaced therefrom, said band being normally open, means for feeding a flat sheet between the open band and the cylinder, means for closing said band to wrap the sheet substantially all the way around the cylinder and hold it in true cylindrical form for scanning, mechanism for scanning the sheet held on said cylinder, means for producing a relative linear displacement between the supported sheet and said mechanism during a scanning operation, and means for operating said band to release the scanned sheet.

2. In a facsimile machine, a stationary cylinder for holding a unitary sheet to be scanned, a flexible band adapted to receive a flat sheet, means for flexing the sheet holding band around the cylinder to wrap the sheet thereon in substantially complete cylindrical form for scanning, means for scanning said sheet, means for sliding said band and sheet along the cylinder during the scanning operation, and means for automatically opening said band at the end of a scanning operation to release the scanned sheet.

3. In a facsimile machine, a stationary cylinder, means for wrapping and holding a sheet on said cylinder for scanning, said means including a flexible band held under tension to slide said sheet axially along the cylinder during the scanning operation, means for scanning said sheet, a support for the scanned sheet as it slides off one end of the cylinder, and means for operating said band to release the scanned sheet from said support.

4. In a facsimile transmitter, a stationary cylinder, a support movable parallel to the axis of said cylinder and having means for holding a unitary message sheet thereon, said holding means engaging the sheet at the center only, so that the side portions of the sheet are free, means engaging the side portions of the sheet to wrap the sheet substantially all the way around the cylinder for scanning while the sheet remains fastened to said support, and mechanism for scanning a sheet wrapped around the cylinder.

5. In a facsimile machine, a cylinder for holding copy to be scanned, pivoted arms supporting a flexible band adapted to receive a sheet, means for closing said arms to flex the band and thereby wrap the sheet around the cylinder, mechanism for scanning the sheet held on said cylinder, connections for producing a relative displacement of the supported sheet and said mechanism during a scanning operation, and means for opening said arms to release the scanned sheet.

6. In a facsimile machine, a cylinder for holding copy to be scanned, a pair of pivoted arms carrying a flexible band which is flat when the arms are open to receive a sheet under the cylinder, means for closing the arms to flex the band around the cylinder whereby the sheet is wrapped on the cylinder and held in scanning position, mechanism for scanning said sheet, connections for producing a relative displacement of the supported sheet and said mechanism during a scanning operation, and means for opening said arms to release the scanned sheet.

7. In a facsimile machine, a stationary cylinder for holding copy to be scanned, a carriage slidable adjacent to said cylinder, pivoted arms mounted on said carriage so as to open and close, a flexible band carried by said arms and adapted to receive a sheet when the arms are open, means for closing said arms to cause said band to wrap the sheet around said cylinder and hold it in position for scanning, mechanism for scanning said sheet during the sliding movement of said carriage, and means for opening said arms for removal of the scanned sheet.

8. In a facsimile transmitter, a stationary cylinder, a movable belt for carrying a series of message sheets in spaced alignment, means including a flexible element for wrapping said sheets one at a time substantially all the way around said cylinder while they remain on the belt, each wrapped sheet forming a true cylinder of paper for accurate scanning, and means for scanning each sheet on said cylinder.

9. In a facsimile transmitter, a stationary cylinder, a movable belt for holding a plurality of spaced message sheets which are brought one at a time into alignment with said cylinder, a sliding carriage having means for holding a sheet on said cylinder for scanning while the sheet remains on the belt, means for scanning said sheet, and means for moving the belt and the carriage in unison during the scanning operation.

10. In a facsimile transmitter, a movable belt having means for holding a series of message sheets in spaced alignment, a stationary cylinder supported lengthwise over the belt which moves parallel to the cylinder and carries the sheets under the cylinder one at a time, means for wrapping an aligned sheet substantially all the way around said cylinder while the sheet remains on the belt, mechanism for scanning said sheet, and means for operating said wrapping means to release the scanned sheets for removal.

11. In a facsimile transmitter, a movable belt for holding a plurality of spaced message sheets, a motor for operating said belt, means for scanning the sheets one at a time while they remain on the belt, a device located at a definite point in relation to said scanning means for removing a scanned sheet from the belt, and means for automatically stopping the belt after the last sheet has been removed therefrom, said automatic belt stopping means including a circuit controlled by the absence of a message sheet on the belt to deenergize said motor.

12. A facsimile machine having a movable belt provided with metal clips for holding a plurality of spaced message sheets, a motor for operating said belt to feed said sheets into scanning position one at a time, mechanism for successively scanning said sheets as they are brought into scanning position by said belt, and means controlled by said metal clips for stopping the belt under predetermined conditions, said automatic belt stopping means including apparatus controlled by the absence of a message sheet in a certain position on the belt to open the circuit of said motor.

13. In a facsimile machine, a movable belt having a plurality of spaced clips for holding each a message sheet at the center, said clips being so constructed that the sheets are slid under the clips by movement lengthwise of the belt so that the clips engage the forward edge of each sheet, means for operating the belt, means for scanning the sheets one at a time while they remain attached to the clips, and a device arranged adjacent to said belt for automatically sliding the scanned sheets from under the clips as each sheet passes a given point during movement of the belt.

14. In a facsimile machine, a pair of plates separated lengthwise to provide a channel, a belt movable in said channel and having means for holding a plurality of message sheets in spaced alignment, said sheets being considerably wider than said belt and said holding means engaging the sheets at the center only, so that the side portions of the sheets are free of the belt and extend laterally over said plates which guide the sheets during movement of the belt scanning mechanism operatively associated with said belt, and means for supporting the sheets one at a time in cylindrical form for scanning while they remain fastened to the belt.

15. In a facsimile machine, a stationary cylinder, a narrow conveyor belt having a plurality of spaced flexible pads secured thereto and extending on both sides beyond the belt, said pads being secured at the center only, so that the extending side portions thereof are free of the belt, means for holding a message sheet on each pad, the size of the pads being substantially the same as the size of the sheets, means for flexing said sheet holding pads around said cylinder one at a time, whereby the sheets are held in scanning position, internal scanning means for the sheets on the cylinder, and connections for producing relative linear displacement of said scanning means and a sheet on said cylinder.

16. In a facsimile machine, a pair of stationary cylinders supported in axial alignment and slightly separated at their adjacent ends, means including a flexible member for holding a sheet wrapped substantially all the way around one of said cylinders, connections for operating said sheet holding means to slide the wrapped sheet over to the other cylinder, mechanism for scanning the inside surface of said sheet as it slides from one cylinder to the other, said mechanism having scanning means rotatable in the space between the two cylinders, and means for opening said flexible member to release the scanned sheet from said other cylinder.

17. In a facsimile transmitter, a pair of stationary cylinders supported in axial alignment and slightly spaced at their adjacent ends, means including a flexible member for wrapping a message sheet with a heading substantially all the way around one of said cylinders, a sheet feeding device associated with said flexible wrapping member for so positioning each sheet automatically with respect to said member that the heading portion overlaps one end of said cylinder, optical scanning mechanism adapted to throw a rotary spot of light on the inner surface of the sheet in the space separating the cylinders, and means for operating said sheet wrapping means to slide the wrapped sheet from one cylinder to the other during the scanning operation, said overlapping portion of the sheet when wrapped around the cylinder being clear of the scanning mechanism so that only the message portion of the sheet is scanned.

18. A facsimile transmitter having a stationary cylinder, a movable belt for holding a plurality of spaced message sheets which are brought one at a time into alignment with said cylinder, a reciprocable carriage mounted for movement independently of said belt and having means for holding a sheet wrapped around said cylinder for scanning while the sheet remains on the belt, means for moving the belt and the carriage in unison during the scanning operation at predetermined low speed, means for automatically increasing the speed of said belt and carriage at the end of a scanned message until the carriage reaches the limit of its forward travel, and means for automatically returning the carriage to starting position.

19. In a facsimile transmitter, a movable belt having means for holding a plurality of message sheets in spaced alignment, the messages on said sheets being of various lengths, a reciprocable carriage mounted for movement independently of said belt for supporting said sheets one at a time in scanning position while they remain attached to the belt, said carriage having a definite length of travel from initial to final position, means for scanning a sheet supported on said carriage, means for moving said belt and carriage in unison at low speed during the scanning operation, the final position of said carriage corresponding to the end of the long message carried by a sheet, means for automatically speeding up the belt and carriage at the end of a short message until the carriage reaches its final position, and means for automatically returning the carriage from final to initial position.

20. In a facsimile machine, a cylinder for holding copy to be scanned, a slidable carriage having pivoted jaws adapted to close and open, means for feeding a message sheet to the jaws when open, means for closing said jaws to wrap the sheet around said cylinder and hold it for scanning, mechanism for scanning said sheet, means for sliding said carriage and sheet forward during the scanning operation, said carriage having a definite length of travel from initial to final position, means for opening said jaws when the carriage reaches final position to release the scanned sheet, means for returning the carriage to initial position, and means operable when the carriage reaches initial position for energizing said jaw closing means to wrap the next sheet around the cylinder.

21. In a facsimile machine, a cylinder for holding copy to be scanned, a slidable carriage having a pair of movable jaws adapted to hold a message sheet on said cylinder, means for successively feeding sheets to said jaws, mechanism for scanning a sheet held on said cylinder, a rotary screw shaft, means for releasably connecting the carriage with said shaft for sliding the carriage and sheet lengthwise of said cylinder during the scanning operation, said carriage having a definite length of travel from initial to final position, an electromagnet adapted when energized to disconnect the carriage from the screw shaft, a second electromagnet adapted when energized to open said jaws and release the scanned sheet, means for energizing both of said magnets when the carriage reaches its final position, and means for returning the released carriage to initial position for the next scanning operation.

22. A facsimile machine comprising a cylinder for holding a unitary sheet of paper to be scanned, a flexible member normally held flat to receive a flat sheet, means for flexing said member to wrap the sheet substantially all the way around said cylinder and hold it in true cylindrical form for scanning, mechanism for scanning the cylindrical sheet, means for producing a relative linear displacement of the supported sheet and said mechanism during a scanning operation, and means for automatically unflexing said member at the end of a scanning operation to release the scanned sheet.

23. A facsimile machine having a stationary cylinder, a slidable carriage provided with means for holding a sheet wrapped around said cylinder, scanning mechanism arranged to operate on a sheet held on said cylinder, connections for sliding said carriage and sheet axially of the cylinder during a scanning operation, a device for operating said sheet holding means to release a scanned sheet from the cylinder, and means for automatically removing a released sheet from the carriage.

24. A facsimile machine having a stationary cylinder, a flexible band adapted to be closed for wrapping and holding a sheet around said cylinder, mechanism for scanning a sheet held on said cylinder, connections for sliding said band and the supported sheet axially of the cylinder during a scanning operation, means for automatically opening said flexible band at the close of a scanning operation while the scanned sheet remains on the open band, and means movable relatively to the open band for automatically removing the scanned sheet therefrom.

25. A facsimile machine having a stationary cylinder, a slidable support for holding a sheet wrapped around said cylinder, scanning mechanism arranged to operate on a sheet held on said cylinder, connections for sliding said support and sheet axially of the cylinder during a scanning operation, means for automatically releasing a scanned sheet from the cylinder while the sheet remains on said support, conveyor means for removing a released sheet from said support and retaining the removed sheet which is thereby carried to a point of discharge, and a device associated with said conveyor means for automatically removing a sheet therefrom at said discharge point.

26. A facsimile machine having a cylinder provided with longitudinal grooves in its outer periphery, a device for holding the sheet wrapped around said cylinder in a substantially perfect cylindrical form, said longitudinal grooves reducing the contact area between the sheet and the cylinder to a practical minimum without distortion of the true cylindrical form of the sheet, connections for effecting relative displacement of said device and cylinder to slide said sheet off the cylinder during a scanning operation, and mechanism for scanning the interior surface of said cylindrical sheet as it slides off the cylinder, the reduced contact area between the sheet and the cylinder correspondingly reducing the friction of the sliding sheet.

27. A facsimile machine having a pair of stationary cylinders arranged in axial alignment, a carriage mounted to slide parallel to said cylinders and having means for holding a unitary sheet wrapped around one of said cylinders for scanning, connections for operating said carriage to slide the wrapped sheet lengthwise of the first cylinder and carry it over to the second cylinder, mechanism for scanning said sheet internally during its sliding movement from one cylinder to the other, automatic means for stopping the forward movement of the carriage when the scanned sheet has been transferred to the second cylinder, and a device for causing the stopped carriage to release the scanned sheet from the second cylinder.

28. A facsimile telegraph machine having a scanning mechanism, a device for feeding sheets to said mechanism for successive scanning, a stamp associated with said mechanism for impressing certain indicia on each sheet, and connections automatically controlled by said sheets for successively operating said stamp in timed relation to said scanning mechanism, said connections including a detecting element responsive to the presence of a sheet for causing the operation of said stamp.

29. A facsimile telegraph machine having a scanning mechanism, a support for holding a message sheet in scanning position, a device for feeding sheets to said support for successive scanning by said mechanism, a stamp associated with said scanning mechanism for impressing certain indicia on each sheet, and connections for automatically operating said stamp in timed relation to said scanning mechanism, said connections including a detecting element responsive to the presence of a sheet in a predetermined position relatively to said support for causing the operation of said stamp.

30. A facsimile telegraph machine having a scanning mechanism, a movable belt for feeding message sheets successively to said mechanism for scanning, a stamp associated with said mechanism for impressing certain indicia on each sheet, and connections for automatically operating said stamp in timed relation to said scanning mechanism, said connections including a detecting element responsive to the presence of a sheet in a predetermined position on said belt for causing the operation of said stamp.

31. A facsimile telegraph machine having a movable belt for holding a plurality of spaced message sheets, mechanism for scanning said sheets one at a time while they remain on the belt which carries the scanned sheets to a point of removal, an electric stamp associated with said belt for impressing certain indicia on each sheet, and electrical connections automatically controlled by the movement of said belt for energizing said stamp to impress each sheet before its removal from the belt, said connections including an electric detecting element responsive to the presence of a sheet in predetermined position on the belt for causing the operation of said stamp.

32. In a facsimile transmitter, the combination of a stationary cylinder supported at one end, a device for wrapping and holding a sheet substantially all the way around each cylinder for scanning, connections for operating said device to slide the wrapped sheet off the other end of said cylinder during a scanning operation, a rotary hollow shaft extending axially through said cylinder and having at least one open end, a lens mounted at an open end of said shaft, a motor for operating said shaft, an exciter lamp arranged to direct a beam of light through said lens to said hollow shaft, a light chopper disk driven by said motor and arranged between said lamp and lens to interrupt the light beam at a predetermined frequency before it enters the shaft, light reflecting means mounted in said hollow shaft to form a rotary scanning spot of light on the inner cylindrical surface of said sheet where it slides off the cylinder, and a photocell arranged to receive light reflected from the scanned surface of the sheet.

33. In a facsimile transmitter, a movable endless belt adapted to support a plurality of message sheets in flat condition, said belt having clips arranged to engage the individual message sheets at their forward ends and hold them in uniformly spaced alignment, scanning apparatus having a stationary drum mounted above the horizontal run of said belt, means for wrapping said sheets in automatic sequence around said drum for scanning one at a time while the sheets remain fastened to the belt by said clips, means for moving the belt forward during a scanning operation, means for automatically restoring each scanned sheet to its normal flat condition on the belt, and an automatic stripping device mounted in line with said belt at a definite point in relation to said stationary drum for stripping the scanned sheets from the clips during the movement of the belt.

34. A facsimile machine provided with a stationary cylinder, means for holding a sheet on said cylinder so that the forward end of the sheet overlaps the adjacent end of the cylinder, mechanism for scanning said overlapping portion of the sheet, a device for sliding the sheet off the cylinder during the scanning operation, and means engaging the inner surface of the sheet for holding its overlapping portion in cylindrical form as the sheet slides off the stationary cylinder.

35. In a facsimile transmitter, a stationary cylinder, a movable narrow belt having fasteners to hold a series of message sheets thereon in spaced alignment, said sheets extending laterally beyond the belt and said fasteners being arranged to engage the sheets at the center only, whereby the side portions of the sheets remain free, means engaging the side portions of the sheets and bending them around said cylinder one at a time while the sheets are held on the belt, means for scanning the sheets on said cylinder, and means for releasing the side portions of the scanned sheets while they are still held by said fasteners.

36. A facsimile transmitter having a stationary hollow cylinder, a movable belt arranged lengthwise adjacent to said cylinder for conveying a plurality of message sheets successively into alignment with the cylinder, a device having means for wrapping a message sheet around said cylinder while the sheet remains on the belt, means for operating said device to slide the sheet off one end of the cylinder for internal scanning, a rotary hollow shaft extending through said cylinder, an electric motor for rotating said shaft at predetermined scanning speed, optical mechanism for projecting a beam of light axially through said hollow shaft, means carried by said shaft for directing the beam radially outward to form a scanning point on the inner surface of the supported sheet where it overlaps the cylinder, and a photocell arranged to receive light from the scanned surface of the sheet.

RALEIGH J. WISE.
GARVICE H. RIDINGS.

REFERENCES CITED

The following references are of record in the file of this patent:

UNITED STATES PATENTS

| Number | Name | Date |
|---|---|---|
| 400,599 | Robertson | Apr. 2, 1889 |
| 1,370,669 | Potts | Mar. 8, 1921 |
| 1,719,392 | Cooley | July 2, 1929 |
| 1,792,264 | Alexanderson | Feb. 10, 1931 |
| 1,800,031 | Schroter | Apr. 7, 1931 |
| 1,876,931 | Heywood et al. | Sept. 13, 1932 |
| 1,877,566 | Elsey et al. | Sept. 13, 1932 |
| 1,905,153 | Cloud | Apr. 25, 1933 |
| 1,912,708 | Hopkins | June 6, 1933 |
| 1,925,814 | Nicolson | Sept. 5, 1933 |
| 1,973,406 | Cooley | Sept. 11, 1934 |
| 2,044,831 | Chereau | June 23, 1936 |
| 2,076,220 | Bennett | Apr. 16, 1937 |
| 2,153,858 | Wise | Apr. 11, 1939 |
| 2,196,730 | Hooker | Apr. 9, 1940 |
| 2,209,719 | Rustad | July 30, 1940 |
| 2,279,295 | Blanton | Apr. 14, 1941 |
| 2,300,809 | Reeves | Nov. 3, 1942 |
| 2,312,626 | Chamberlin et al. | Mar. 2, 1943 |
| 2,319,489 | Carlson | May 18, 1943 |
| 2,356,058 | Hunting | Aug. 15, 1944 |
| 2,365,741 | Wise | Dec. 26, 1944 |
| 2,394,577 | Wise | Feb. 12, 1946 |
| 2,394,649 | Young | Feb. 12, 1946 |
| 2,397,553 | Light | Apr. 2, 1946 |
| 2,402,965 | Hornberger | July 2, 1946 |
| 2,435,260 | Wise | Feb. 3, 1948 |